US006266883B1

(12) United States Patent
Heinemann et al.

(10) Patent No.: US 6,266,883 B1
(45) Date of Patent: Jul. 31, 2001

(54) METHOD OF MAKING A GRATE PLATE

(75) Inventors: Otto Heinemann; Hermann Niemerg, both of Ennigerloh; Norbert Bredenhöller; Ludger Brentrup, both of Oelde, all of (DE)

(73) Assignee: Krupp Polysius AG, Beckum (DE)

( * ) Notice: Subject to any disclaimer, the term of this patent is extended or adjusted under 35 U.S.C. 154(b) by 0 days.

(21) Appl. No.: 09/350,751

(22) Filed: Jul. 9, 1999

Related U.S. Application Data

(62) Division of application No. 08/857,532, filed on May 16, 1997, now Pat. No. 5,947,719.

(30) Foreign Application Priority Data

Jun. 5, 1996 (DE) ............................................ 196 22 636

(51) Int. Cl.[7] ...................................................... B23P 15/16
(52) U.S. Cl. ............................................................ 29/896.6
(58) Field of Search .............................. 29/890.03, 896.6; 432/78

(56) References Cited

U.S. PATENT DOCUMENTS

| | | |
|---|---|---|
| 2,431,799 | 12/1947 | Gaffney . |
| 4,600,380 | 7/1986 | Von Wedel . |
| 4,870,913 | 10/1989 | Schneider . |
| 5,549,471 | 8/1996 | Tegtmeier et al. . |
| 5,626,089 | 5/1997 | Schneider et al. . |
| 5,788,480 | 8/1998 | Bentsen et al. . |

FOREIGN PATENT DOCUMENTS

| | | |
|---|---|---|
| 0 167658 | 9/1984 | (DE) . |
| 3 734043 | 10/1987 | (DE) . |
| 195 379047 | 10/1995 | (DE) . |

*Primary Examiner*—P. W. Echols
(74) *Attorney, Agent, or Firm*—Reising, Ethington, Barnes, Kisselle, Learman & McCulloch, P.C.

(57) ABSTRACT

A method of forming a grate plate for installation as part of a grate assembly in which free flowing abrasive material is supported for movement along a path while treatment gas flows upwardly through such material. The grate plate includes a relatively thin carrier plate modified to present a highly wear resistant upper surface, the carrier plate having slots formed therein through which treatment gas flows for passage through the material. The method is one which is economical even though the carrier plate itself is formed from relatively expensive material.

16 Claims, 4 Drawing Sheets

METHOD OF MAKING A GRATE PLATE

This application is a division of application Ser. No. 08/857,532, filed May 16, 1997 now U.S. Pat. No. 5,947,719.

The invention relates to a grate plate for installation in a grate apparatus for beat exchange between free-flowing material and treatment gas, particularly for fixing on a grate plate support in a grate cooler.

BACKGROUND OF THE INVENTION

It is generally known in the art for grate plates of the aforementioned type to be installed in various kinds of grate apparatus in which a free-flowing material, e.g. cement materials, ore materials and the like, are treated in the particular manner necessary with the aid of gases flowing upwards from the bottom through the layer of material. This treatment may for example be preheating, preburning, burning and above all cooling of the said materials.

In the as yet unpublished German Patent Application No. 195 37 904.7 a grate plate of approximately the aforementioned type is proposed which by its construction should achieve a particularly favourable and uniform flow through the material for treatment and thus an optimum heat exchange between material and treatment gas. For this purpose the document proposes that the gas flow channels be constructed like a pipe and approximately in zigzag form, and overall in the material transport direction they should extend obliquely from the lower face of the plate to the upper face of the plate.

A box-shaped grate base element with two lateral supporting flanges is also known from EP-B-O 167 658, in which the supporting flanges extend vertically and in the longitudinal direction of the plate and have attached to them in approximately ladder or dovetail form strip-shaped members which determine the surface and form between them gas slots which run through the entire width of the grate element. In each case two such ladder-shaped or fork-shaped structures consisting of lateral supporting flanges and strip members are put together in a complementary and form-locking manner in such a way that the strip members which extend parallel to one another form overall with the gas flow slots remaining between them a material support surface which is level on the top.

A grate cooler for cooling hot bulk material is disclosed in DE-A-37 34 043. In this document box-shaped grate plate supports are provided which have level upper cover plates each covered by an equally flat grate plate which is bent downwards at its front end. Slot-shaped gas flow openings are provided in the cover plate of the grate plate support and in the grate plate which is disposed flat above it, whilst slot-shaped connecting openings are formed between these two superimposed level plates as a connection between the gas flow openings. Since the gas flow openings in the two superimposed level plates are in each case displaced with respect to one another in the longitudinal direction of the plate, solids should be prevented from falling downwards through the gas flow openings in the event of a failure of the cooling gas supply, in which case throttle components can also be disposed in this system of openings.

In the two last-mentioned grate plate constructions it has been repeatedly found that the upper faces which come into contact with the material are still relatively susceptible to wear, and this is apparent particularly when relatively strongly abrasive material, such as is the case for example with cement clinker which is to be cooled, is to be transported along on the grate apparatus or a corresponding cooler grate and thereby to be cooled with cooling gas.

The object of the invention, therefore, is to make further improvements to a grate plate. In such a way that even in the case of strongly abrasive material, such as for example cement clinker or the like, the material carrier plate has a relatively long service life (high durability) and is distinguished by relatively favourable and economical manufacture.

SUMMARY OF THE INVENTION

In the construction of the grate plate according to the invention the material carrier plate thereof is produced from rolled steel plate material which is reworked or modified to high wear resistance, i.e. subsequently rendered highly wear-resistant, and the gas flow channels—viewed in vertical longitudinal section through the material carrier plate—are machined into this material carrier plate so that they extend substantially in a straight line and obliquely upward in the transport direction.

Rolled steel plate material which is reworked to high wear resistance is already known from general mechanical engineering for machine parts which are in danger of wear, but it has not been used hitherto for the construction of material carrier plates in grate plates of the said type. This is presumably because the material carrier plate of such a grate plate—particularly during the treatment of strongly abrasive material such as cement clinker or the like—is subject not only to high levels of attack by friction or wear but also to a considerable dead weight, so that correspondingly large plate thicknesses have been regarded as necessary, but they make the said plate material relatively expensive.

In the internal field trials on which the invention is based it was shown that the rolled steel plate material which is used according to the invention for the production of the material carrier plate and is subsequently rendered highly wear-resistant, and which in any case consists of a special alloy. brings with it an unexpectedly marked prolongation of the service life by comparison with the previously used partially tempered materials, that is to say it is considerably more wear-resistant than the previously known and used materials for these material carrier plates. Due to this fact the great advantage arises that in the grate plate according to the invention the material carrier plate can be produced from relatively thin plate material and can nevertheless have a longer service life than the known constructions. It is also advantageous that commercially available plate material, that is to say rolled steel plate material reworked to high wear resistance, can be used for the production of this material carrier plate.

In the material carrier plate produced in this way it is also regarded as particularly advantageous if—as already explained to some extent above—the gas flow channels are machined into this material carrier plate so that they extend substantially in a straight line and obliquely in the transport direction. This latter can occur in a relatively simple but very precise manner appropriately adapted to the particular requirements, above all by a special high-energy cutting process, as will be explained in greater detail below. The construction and alignment of the gas flow channels ensures a good penetration of the material situated on the material carrier plate by the gas to be delivered (e.g. cooling, air in the case of a cooler grate), and at the same time a certain conveying effect can also be achieved for the material to be transported along on the appertaining grate apparatus.

Since in this grate plate according to the invention the material, carrier plate—as already explained—can be produced from relatively thin plate material, it is advantageous to ensure stabilisation thereof so that no disruptive vibrations can build up during the operation of the appertaining grate apparatus, e.g. grate cooler. For this reason it is first of all provided that the basic plate body has within its outer frame structure a supporting structure made from reinforcing elements which connects parallel frame side parts firmly together, and on the reinforcing elements the material carrier plate is supported and at least partially fixed at locations between the gas flow channels. Thus this supporting structure connects parallel frame side parts, particularly the longitudinal side parts, firmly together with sufficient stability, the material carrier plate being additionally supporting with its lower face on the reinforcing elements of this supporting structure and in each case being at least partially fixed at locations between the gas flow channels. In this way it is also simultaneously ensured that the treatment gas or cooling gas is not influenced at all or is not significantly impeded on its way from the lower face of the plate to the upper face of the plate (into the material to be treated).

In the aforementioned connection it is also advantageous that the reinforcing elements of the supporting structure are constructed at least to some extent in the form of supporting ribs which are spaced parallel with respect to one another, extend in the transverse direction of the plate between the longitudinal side parts of the outer frame structure and have a flat channel cross-section which is open towards the top, wherein one longitudinal edge of the channel of each supporting rib is directed against the lower face of the material carrier plate and is connected to this lower face of the plate, whilst the other longitudinal edge of the channel runs parallel and spaced with respect to the lower face of the plate to form a gas flow gap, and that the gas flow channels in the material carrier plate extend in a slot shape and approximately parallel to the supporting ribs, opening on the lower face of the plate in each case over the channel cross-section of the underlying supporting ribs.

With regard to the method of producing such a grate plate it is already apparent from the foregoing that according to the invention a rolled steel plate material which is reworked to high wear resistance or subsequently rendered highly wear-resistant is used for the grate plate and the gas flow channels are machined into the material carrier plate by a special high-energy cutting process so that they extend in a slot shape in the transverse direction of the plate Thus the material carrier plate can be produced relatively economically and precisely.

In the production of the grate plate according to the invention it is also important, with a view to relatively favourable and economical production above all of the material carrier plate and for a well distributed and unhindered passage of the treatment gases, that the gas flow channels can be machined into the material carrier plate as economically and precisely as possible This is advantageously done by the aforementioned high-energy cutting process.

Thus for the rolled steel plate material commercially available compound steel plates can be used in which the uppermost layer is retempered so as to be particularly highly wear-resistant or is formed by a hard-facing layer and has a hardness of approximately 58 to 68 HRC (Rockwell hardness) This rolled steel plate material is distinguished by a particularly high stability.

As a high-energy cutting process for machining the gas flow channels into the material carrier plate it is advantageous to use a plasma burning process, a laser burning process, a high-pressure water jet/abrasive substance cutting process or some other similar high-energy cutting process. In any case it can be ensured by such—known—cutting processes that the rolled steel plate materials which are subsequently made highly wear-resistant (for example retempered or provided with a hardfacing layer) can also be provided extremely reliably, precisely and economically with the necessary gas flow channels.

In so far as the construction and arrangement of the gas flow channels in the material carrier plate is concerned, there are several possible designs therefor it is generally advantageous for the treatment of the material if the gas flow channels—viewed in vertical longitudinal section through the grate plate and thus through the material carrier plate—are machined into the material carrier plate so that they extend substantially in a straight line and obliquely in the material transport direction, and in this case from the lower face of the plate to the upper face of the plate they can have a slot width which remains substantially constant or which narrows substantially uniformly. This favours not only the heat exchange between material and gas but also a certain conveying effect for the material situated on the appertaining grate apparatus Furthermore it may be advantageous if in the longitudinal direction of the plate a plurality of parallel transverse rows with gas flow channels—viewed in the material transport direction—are machined at least into a front longitudinal portion of the carrier plate and a plurality of gas flow channels of equal size or equal length are provided in each transverse row. By contrast, in other examples it may, however, be advantageous (for example with a view to simplified manufacture) if the gas flow channels—viewed in the material transport direction—are machined at least into the front longitudinal portion of the material plate and a plurality of transversely extending gas flow channels which extend substantially continuously in slot form between outer frame side parts are disposed behind one another with equal spacing in the longitudinal direction of the plate.

In this manner according to the invention of producing the grate plate it is also regarded as particularly advantageous if within the outer frame structure of the basic plate body a supporting structure consisting of reinforcing elements is constructed on which the material carrier plate is supported and at least partially fixed at locations situated between gas flow channels. This measure proves particularly advantageous in that as a result the rolled steel plate material reworked to high wear resistance can be relatively thin. This material carrier plate can—as already indicated above—be optimally supported and can be produced from relatively economical, commercially available rolled steel plate material without the danger of a build-up of unwanted vibrations in the material carrier plate or unwanted bending stresses therein being able to occur.

THE DRAWINGS

The invention will be explained in greater detail below with reference to the drawings, in which.

DETAILED DESCRIPTION

Figure 1:
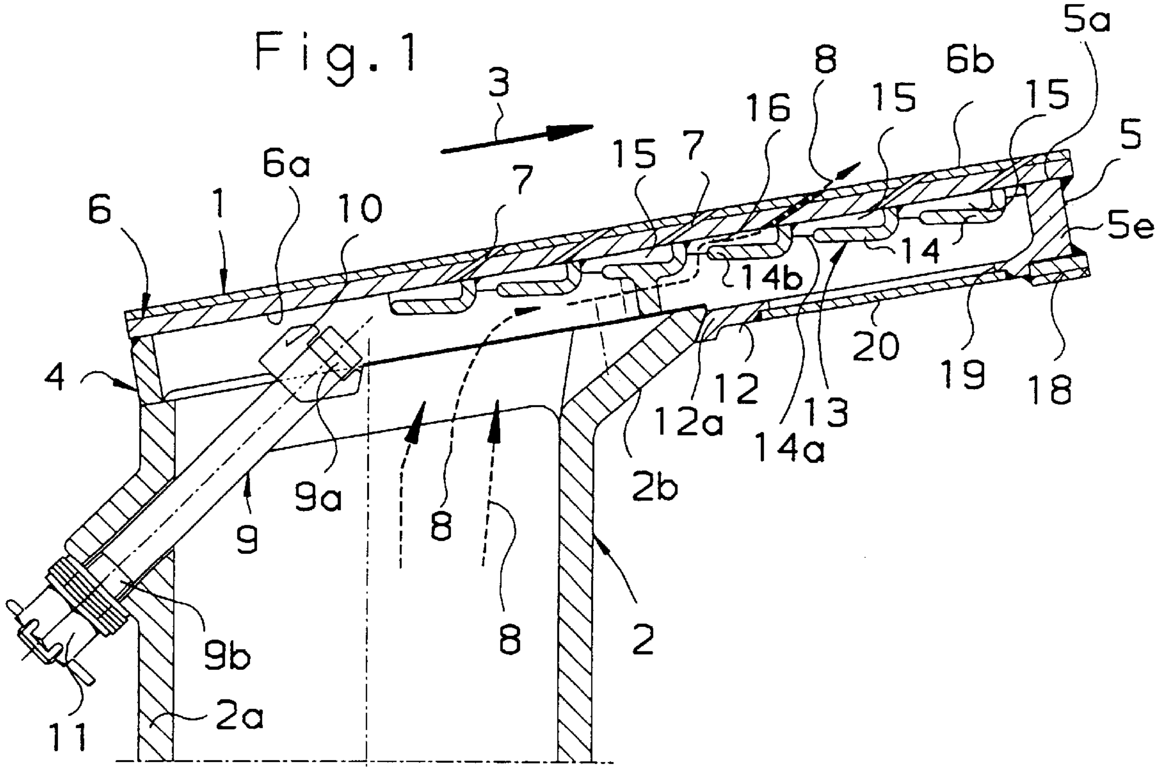
FIG. 1 shows a vertical longitudinal section through a grate plate produced according to the invention and fixed on a grate plate carrier.

In the embodiments which are illustrated and described below it may be assumed in each case that the grate plate assembly according to the invention is designed and intended for installation into a grate cooler, preferably a reciprocating grate cooler, for cooling strongly abrasive hot material. However, it should also be mentioned at this point that the grate plate assembly according to the invention can be installed with equally great success into other somewhat similar grate apparatus in which free-flowing material is to be subjected to a heat exchange with treatment gas, for example preheating or burning of the particular material. A particularly preferred use of this grate plate assembly according to the invention is, however, constituted by the said installation into a grate cooler for extremely strongly abrasive materials, as is the case above all with cement clinker. Since grate coolers of the type in question here, such as for example reciprocating grate coolers or the like, are generally known, there is no need to go into the construction of such a grate cooler in any greater detail here.

The general construction of the grate plate assembly 1 according to the invention and the installation or fixing thereof on a grate plate support 2 in an appertaining grate cooler will be explained first of all with reference to FIGS. 1 and 2. In this connection it should be generally presupposed that—as is known per se a plurality of grate plate supports 2 are disposed in a corresponding manner behind one another in the longitudinal direction of the grate cooler or of the cooler grate installed therein, these grate plate supports 2 being aligned transversely or at right angles to the longitudinal direction of the cooler and thus also to the direction of transport (arrow 3) of the material to be cooled. In this case a transverse row of a plurality of grate plates 1 is disposed—perpendicular to the drawing plane of FIG. 1—on each grate plate support 2 so that the transverse rows of grate plates adjacent to one another in the transport direction overlap one another like scales.

The grate, plate assembly 1 contains as principal components a basic plate body 4 with an outer frame structure 5 as well as a material carrier plate or member 6 which is fixed on the upper edge 5*a* of this frame structure 5—preferably by weld seams—and which is designed overall as a level plate A plurality of gas flow slots 7 which are substantially the same size and of similar construction are formed in this material carrier plate and pass through this material carrier plate 6 from the lower face 6*a* to the upper face 6*b*

The grate plate support 2 is constructed as a hollow body and in addition to the arrangement and fixing of the grate plates 1 it also serves at the same time for supplying cooling gas or cooling air, as is indicated in FIG. 1 by broken arrows 8, so that this cooling gas (arrow 8) can be introduced from below into the grate plate 1 which is somewhat like a hollow box and can then enter and be uniformly distributed in the material for cooling which is located on the upper face of the material carrier plate 6 In this case good cooling of the grate plate itself also takes place at the same time.

A rapid, reliable and releasable fixing of the grate plate 1 on the grate plate support 2 is ensured by a tightening bolt 9 which engages with its head portion 9*a* in a fixing attachment 10 constructed in the basic plate body 4 and which with its opposite outer end 9b passes outwards through a longitudinal wall 2*a* of the grate plate support 2 and is held there with the aid of a nut 11. It can also be seen in FIG. 1 that the front end of the grate plate 1 which points in the material transport direction (arrow 3) is delimited towards the bottom by a base plate 12 which has a rearward connecting edge 12*a* for form-locking connection to the longitudinal edge 2*b* of the hollow grate plate support 2 facing it.

For the construction of this grate plate 12 according to the invention it is important that the material carrier plate 6 is produced from rolled steel plate material reworked to high wear resistance, i.e. a rolled steel plate material produced from the outset from a special alloy is subsequently rendered highly wear-resistant, e.g. retempered or provided with a hard-facing layer. Such rolled steel plate material is obtainable commercially, but has hitherto been used only for special machine parts in general mechanical engineering, not for grate apparatus for the treatment of abrasive materials.

Because of the extremely high wear resistance of the previously described rolled steel plate material, and in fact even with extremely strongly abrasive cement clinker, this rolled steel plate material can be used with a relatively small plate thickness for the production of the material carrier plates. Because of this plate thickness which is only relatively small even for cooling of cement clinker this rolled steel plate material which has been rendered highly wear-resistant and is very expensive per se has also become particularly interesting for use in grate plates 1 in a grate cooler.

These relatively thin plates for use as the material carrier plate 6 do however involve the danger of a severe bending stress due to the weight of material bearing on them as well as the build-up of unwanted vibrations during operation of the cooler. In order to prevent these dangers, in this grate plate 1 according to the invention it is considered advantageous at the same time that the basic plate body 4 should have within its outer frame structure 5 a supporting structure 13 which connects or spans parallel frame side parts, i.e. at least its longitudinal side walls or longitudinal side parts 5*b* firmly to one another and consists of reinforcing elements, namely supporting ribs 14 and reinforcing webs 15, on which the material carrier plate 6 is supported from below and at least partially fixed, preferably welded on, at locations between the gas flow channels 7 As will be seen in detail from the explanations relating to FIGS. 5 and 6 (basic plate body), the supporting structure 13 is made up in this way with an approximately honeycomb structure (with square honeycombs), so that the material carrier plate 6 is supported and fixed extremely reliably, i.e. free of flexion and vibration, somewhat like a grid on this supporting structure 13.

The further construction of the grate plate 1 according to the invention will now be explained in greater detail first of all with reference to FIGS. 3 and 4, in which the embodiments differ principally only in the construction or production of the material carrier plate 6 or 6' respectively, whilst the basic plate body 4 in both examples can be of the same construction.

Figure 4:
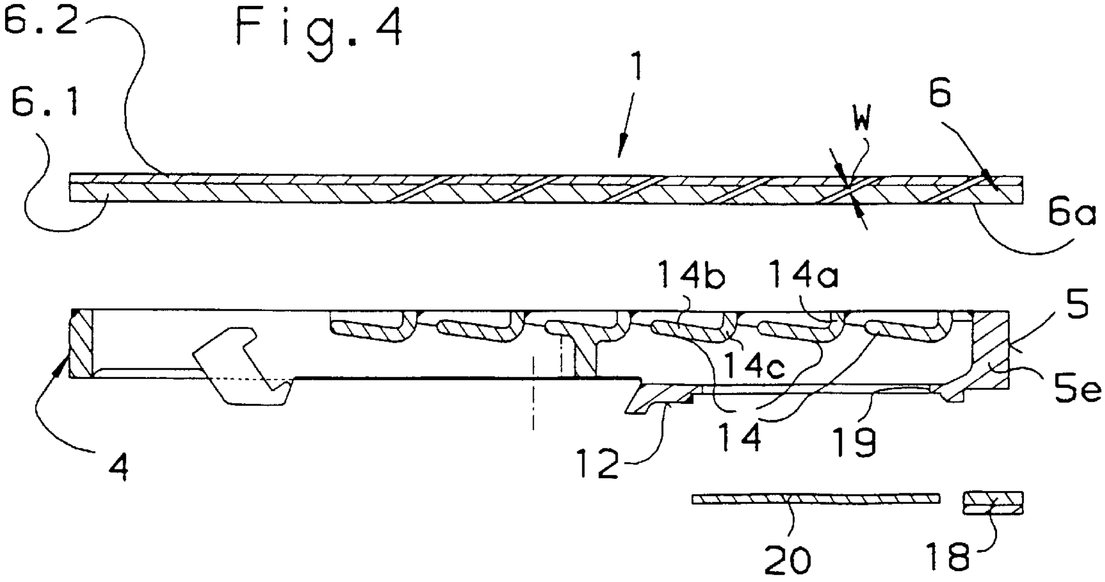
Figure 5:
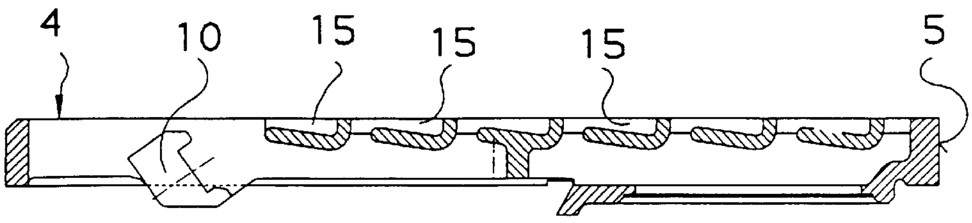
FIG. 5 shows a vertical longitudinal sectional view through the basic plate body according to the line V—V in FIG. 6.
Figure 6:
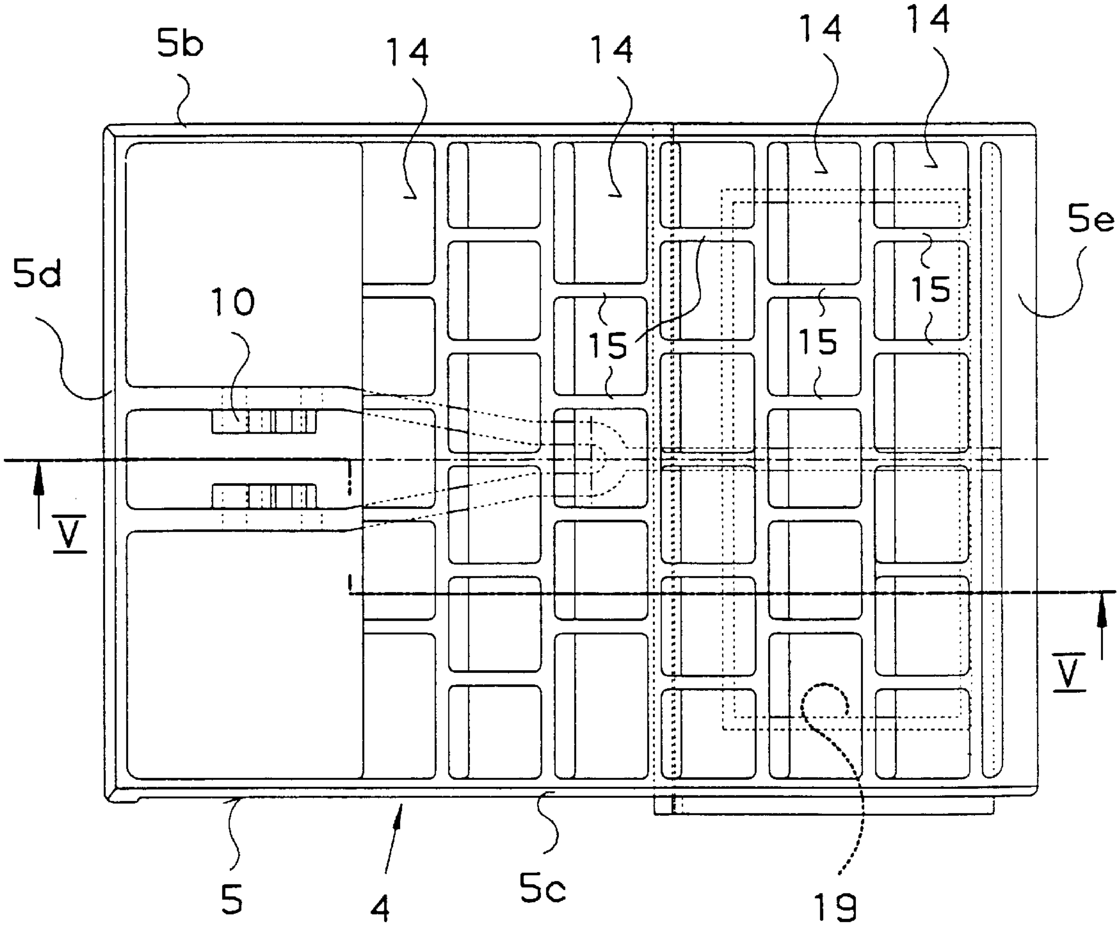
FIG. 6 shows a top view of the basic plate body according to FIG. 5.

As has already been mentioned, the supporting structure 13 consists essentially of the supporting ribs 14 and reinforcing webs 15 which are put together overall approximately in the form of a honeycomb In this case the supporting ribs 14—as can also be seen from FIG. 6—are disposed with parallel spacing with respect to one another, and they extend in the transverse direction of the plate, i.e at right angles to the material transport direction (arrow 3 in FIG. 1) between the longitudinal side walls or longitudinal side parts 5*b* and 5*c* of the outer frame structure 5 and are firmly connected thereto As can be seen from the sectional representations in FIGS. 1, 3, 4 and 5, these supporting ribs 14 advantageously have a flat or planar channel cross-section which is open towards the top, wherein one longitudinal edge (14*a*) of the channel of each supporting rib 14 adjoins the lower face 6*a* of the plate and the other longitudinal edge of the channel (14*b*) is spaced from the lower face 6*a* of the plate For this construction in these first embodiments (FIGS. 1 to 6) each supporting rib 14 has two arms 14*a* and 14*b* which extend in the transverse direction of the plate and which with their outer edges simultaneously form the edges of the channel and of which one shorter arm 14*a* is in each case directed against the lower face 6*a* of the material carrier plate 6 or 6' and is firmly connected to this lower face 6*a* of the plate, for example by short weld seams or weld locations, whilst the other longer arm 14*b* of the rib extends with parallel spacing with respect to the lower face 6*a* of the plate to form a gas flow gap 16 (cf FIG. 1).

According to these first embodiments it is preferred that the aforementioned channel cross-section of each supporting rib 14—as illustrated in FIGS. 1, 3, 4 and 5—is constructed approximately in the form of an unequal-sided angle, wherein the shorter arm 14*a* of the rib which points in the material transport direction (arrow 3) is firmly connected to the lower face 6*a* of the plate, the longer arm 14*b* rises so is directed obliquely backwards towards the lower face 6*a* of the plate, enclosing—as illustrated in the drawings—a shallow acute angle—in the material transport direction (arrow 3) and wherein both arms 14*a* and 14*b* of the rib are connected to one another by a top portion 14*c* which is bent in a curved shape so that they merge directly into one another.

It may be readily seen, particularly in the vertical longitudinal sectional views (e.g. FIGS. 1, 3, 4) through the grate plate 1, that the gas flow channels 7 are generally machined into the material carrier plate 6, 6' so that they extend in a substantially straight line from the lower face 6*a* of the plate to the upper face 6*b* of the plate and rise obliquely with respect to the material transport direction (arrow 3).

The gas flow channels 7 extend in the carrier plate 6, 6' in slot form and approximately parallel to the supporting ribs 14 (in each case viewed perpendicular to the drawing planes of FIGS. 1, 3, 4 and 5). In these first embodiments the gas flow channels 7 open on the lower face 6*a* of the plate in each case—cf. in particular FIG. 1—over the channel cross-section, preferably in the central region of this channel cross-section, of the underlying supporting ribs 14, so that these supporting ribs 14 simultaneously form a type of gas or air guide passage (as an extension or continuation of the gas flow channels 7)

Figure 2:
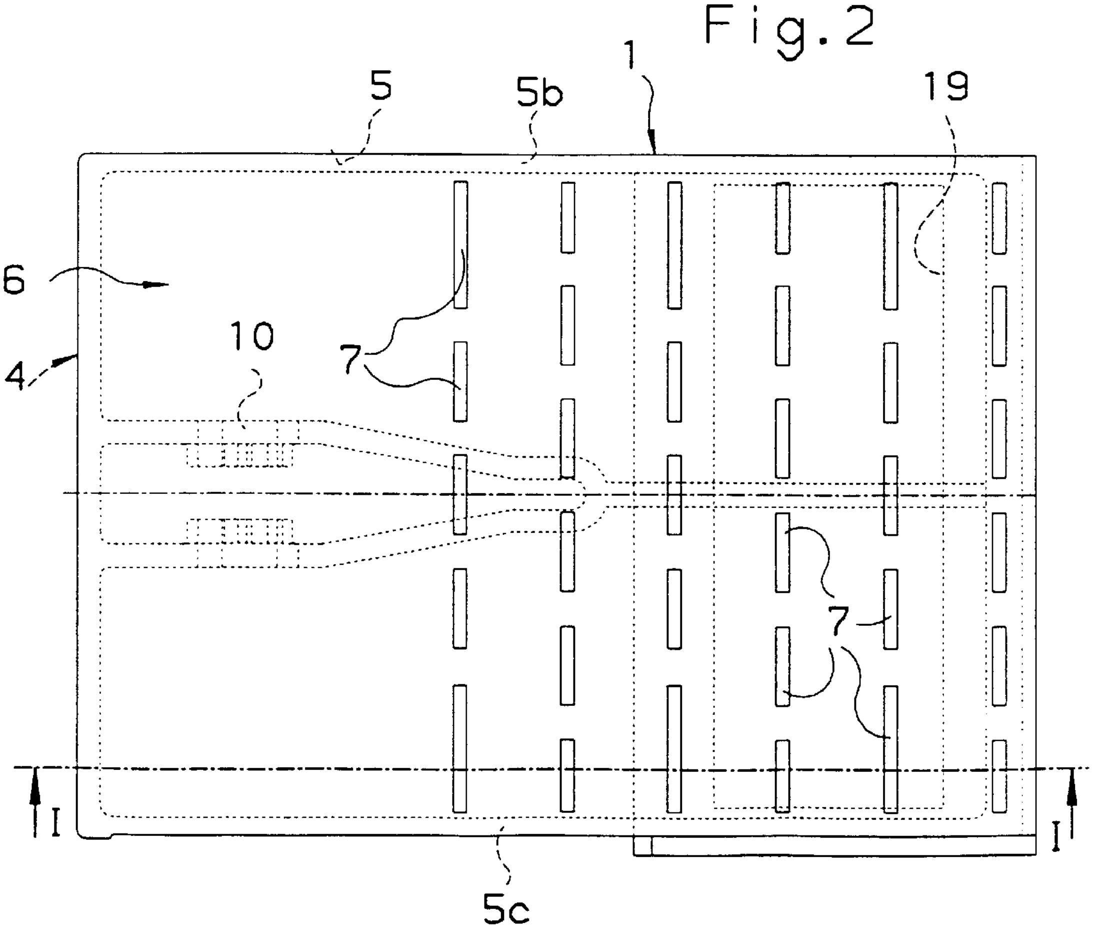
FIG. 2 shows a top view of the grate plate according to FIG. 1.

With a view to a particularly effective and uniform supply of cooling gas or cooling air to the material for cooling, it is regarded as advantageous if—according to a first embodiment—transversely with respect to the material transport direction (arrow 3) a plurality of slot-shaped gas flow channels 7 of substantially the same size are disposed in each case in a transverse row and a plurality of such transverse rows are disposed in the longitudinal direction of the plate (parallel to the material transport direction, arrow 3) at equal distances one behind the other and—viewed in the material transport direction (arrow 3)—at least in the front longitudinal portion of the material carrier plate 6 or 6', as can be seen in the top view of the grate plate 1 according to FIG. 2. The gas flow channels 7 in adjacent transverse rows are offset or staggered with respect to one another.

For good treatment of the material to be cooled it is also regarded as advantageous that the supporting ribs 14 with their relatively flat channel cross-sections form lower-face extensions of the overlying gas flow channels 7 in such a way that according to the arrows 8 indicated in FIG. 1 (for the cooling gas) each gas flow channel 7—viewed in vertical longitudinal section through the grate plate 1—has the overall shape of a duct or passage approximately in zigzag form and essentially extending obliquely from the lower face 6*a* of the plate to the upper face 6*b* of the plate This channel shape on the one hand allows a very effective passage of the cooling gas into the material for cooling which is located on the material carrier plate 6 and on the other hand makes it possible for any very fine particles of material passing downwards through the gas flow channels 7 to be collected in the channel cross-section of the supporting ribs 14 which is open towards the top and to be blown back towards the upper face of the plate Added to this is a good cooling effect on the grate plate itself.

As already repeatedly explained a number of times above, the production of the material carrier plate 6 or 6' from a rolled steel plate material which has been rendered highly wear-resistant is seen as an important feature of this grate plate 1 according to the invention It is particularly economical to produce the material carrier plate 6, 6' from a commercially available rolled steel plate material which has been rendered highly wear-resistant by subsequent hardening, in which at least an uppermost layer is retempered to particularly high wear resistance or is formed by a hard-facing layer and has a hardness—according to Rockwell—of approximately 58 to 68 HRC.

Within the context of the foregoing it may be assumed that the material carrier plate 6 in the example according to FIG. 3 consists throughout of the same material, namely of a commercially available hard material plate or a specially alloyed rolled steel plate material which has been subsequently rendered highly wear-resistant, e.g retempered.

In the embodiment according to FIG. 4, on the other hand, it may be assumed that the material carrier plate 6' has at least two superposed layers 6-1 and 6-2 which lie directly on one another and have the same layer thickness throughout. The lower plate layer 6.1 can consist of a specially alloyed rolled steel plate material, and the upper plate layer 6-2 is applied to this lower plate layer 6.1 as a particularly highly wear-resistant material layer by hard-facing—in a suitable thickness and with the said hardness.

When this relatively hard rolled steel plate material is used for the production of the material carrier plate 6 or 6' it is important to provide a suitable method for machining in the slot-shaped gas flow channels 7. It is therefore proposed that the gas flow channels 7 be machined in by a special cutting process into the material carrier plates 6 or 6', which can be particularly advantageously done very cleanly and accurately with the aid of a plasma burning process which is known per se. However, this machining in of the gas flow channels can also be carried out with the aid of another similar high-energy burning process or also with the aid of a high-pressure water jet/abrasive material cutting process (in which suitable fine abrasive materials, such as e.g. corundum or the like, are added to a relatively fine jet of water delivered at very high pressure; in all these cutting processes the material location to be exposed can be focussed very accurately. In this way comparatively fine or narrow gas flow channels 7 can be machined into the material carrier plate 6 or 6' in the necessary manner relatively true to size, for example with an internal slot width W (FIGS. 3 and 4) of approximately 2–5 to 3 mm. In these first embodiments (cf. FIGS. 1 to 4) a constant internal slot width W is provided from the lower face 6*a* of the plate to the upper face 6*b*.

When these gas flow channels 7 are machined into the material carrier plate 6 or 6' the procedure is then such that in the longitudinal direction of the plate (in the direction of the arrow 3) a plurality of parallel transverse rows with these gas flow channels 7 are machined in—viewed in the material transport direction (arrow 3)—at least. in a front longitudinal portion of the material carrier plate 6, 6' (as can be seen in the drawings) and in each of these transverse rows a plurality of gas flow channels 7 of equal size or length are machined in by a suitable high-energy cutting process (as mentioned above), as can be seen in FIG. 2. In this case each transverse row receives the desired number of gas flow channels 7. With a view to the most uniform possible distribution of the treatment gas in the layer of material in terms of surface area it is also regarded as advantageous to provide the gas flow channels 7 in each case staggered with respect to one another in the adjacent transversely extending rows of channels, approximately according to the representation in FIG. 2.

The construction of the basic plate body 4 and in particular the construction of the supporting structure 13 will be discussed in somewhat greater detail below, reference first of all being made in particular to FIGS. 5 and 6, in which only the basic plate body 4 is shown in a vertical longitudinal section and in top view. The shape and layout of the channel-shaped supporting ribs 14 can first of all correspond to what has already been described above, particularly with reference to FIGS. 3 and 4. In each case a plurality of upright reinforcing webs 15 which extend in the longitudinal direction of the plate (that is to say in the material transport direction according to the arrow 3) are firmly mounted in the channel-shaped supporting ribs 14—uniformly distributed over the length of each supporting rib 14. These reinforcing webs 15 are not only provided so that they are uniformly distributed in the transverse direction of the plate but they also go beyond the channel cross-section of the appertaining supporting rib 14 and in each case firmly connect two adjacent supporting ribs 14 to one another, and they reach from the channel cross-section as far as the lower face 6*a* of the material carrier plate 6 or 6'. In this way the supporting structure 13—as shown in FIG. 6—is of approximately honeycomb construction with square honeycombs, wherein the reinforcing webs 15 support the material carrier plate 6 or 6' at locations between gas flow channels 7 which are adjacent to one another in the transverse direction of the plate and the reinforcing webs are at least partially, e.g. approximately in grid form, firmly connected, preferably welded, to the lower face 6*a* of the plate.

Since the gas flow channels 7 according to the examples of FIGS. 1 to 4—as explained above—are in each case staggered with respect to one another in adjacent transverse rows, the supporting structure 13 is also correspondingly constructed in adaptation to this, i.e. the square honeycombs of its honeycomb structure are likewise staggered with respect to one another, and in fact with square honeycombs offset with respect to one another in transverse rows consisting of supporting ribs 14 and reinforcing webs (15) which are firmly connected to one another.

The basic plate body 4 is advantageously produced with its frame structure 5, the supporting structure 13 constructed therein and the fixing attachment 10 as a one-piece casting, preferably from alloy steel casting, the supporting structure 13 consisting of the supporting ribs 14 and the reinforcing webs 15 being cast in one piece with the frame structure 5. This likewise contributes to economical production of the grate plate 1. When the fixing attachment 10—as shown in FIG. 6—is constructed on at least one reinforcing rib extending approximately in the region of the centre of the length of the grate plate 1 or of the basic plate body 4 between the end face parts (or end walls) 5*d*, 5*e*, then the reinforcing rib also ensures additional stability of the basic plate body 4.

Figure 3:
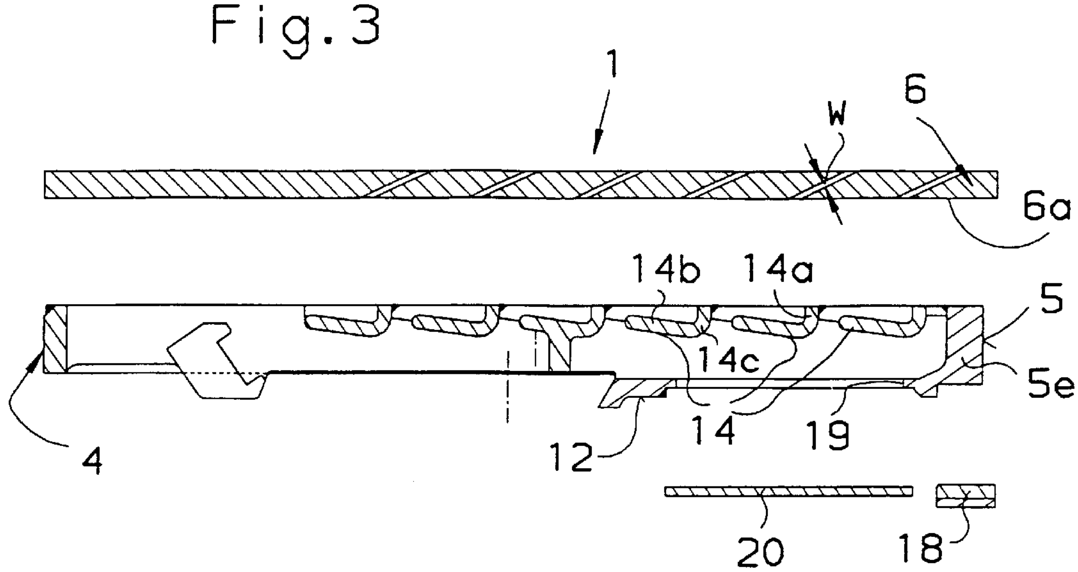
FIGS. 3 and 4 show exploded representations of two different grate plate constructions in each case in a vertical longitudinal section through the grate plate.

If one again considers the vertical longitudinal sectional views in FIGS. 1, 3 and 4, then it will also be seen there that the front end face part 5*e*—when viewed in the material transport direction (arrow 3)—of the frame structure 5 (basic plate body 4) has a lower wear edge 18 with which the front end of this grate plate can slide along on the upperface of the succeeding grate plate—not shown in the drawing—when this relates to a reciprocating grate cooler. For this reason it is then advantageous to produce this lower wear edge 18 from the same highly wear-resistant rolled steel plate material as the material carrier plate 6 or 6', This wear edge 18 is then mounted in a corresponding lower recess in the front end face part 5*a* so as to be fixed, but replaceable in case of need.

As has already been mentioned above at the beginning of the description of the embodiment, the front part of the grate plate 1 which points in the material transport direction (arrow 3) is delimited towards the bottom by the base plate. 12. This base plate 12 is disposed a sufficiently great distance below the supporting structure 13 so that adequate space is ensured for the delivery and distribution of treatment gas from below into the region of the gas flow channels 7. This base plate 12 can likewise be cast in one piece with the basic plate body 4. In this case, however, for sufficient access to the grate plate 1 from below it may additionally be advantageous if there is provided in this base plate 12 a sufficiently large opening 19 which is closed off by a separate cover 20 which can be removed if need be (cf. also FIGS. 4 and 6).

Some variants of the construction described in the above examples will be described below with reference to FIGS. 7 and 8, where the same or similar parts of the first embodiments (FIGS. 1 to 6) and of these further variants (FIGS. 7 and 8) are designated by the same reference numerals, with the addition of a double prime where appropriate, so that it is largely superfluous to explain them again.

In the variant of the grate plate 1" according to FIG. 7 it should first of all be pointed out that in the material carrier plate 6" produced essentially from similar highly wear-resistant rolled steel plate material as in the first embodiment the gas flow channels 7" can generally be machined in with the same distribution and arrangement as was described above with reference to FIGS. 1 to 4 and further explained below with reference to FIG. 8. The gas flow channels 7" in the material carrier plate 6" according to FIG. 7 essentially differ from those of the preceding examples (cf. FIGS. 1, 3 and 4) only in that—viewed in vertical longitudinal section through the material carrier plate 6" they are constructed with an internal slot width W" which narrows substantially uniformly from the lower face 6"*a* of the plate to the upper face 6"*b* of the plate. Also these slot-shaped gas flow channels 7" can be produced very accurately and relatively simply with the aid of the highenergy cutting process already explained above. As can be readily seen in the longitudinal sectional view according to FIG. 7, this internal slot width which narrows or tapers upwards and forwards results in a sort of nozzle shape, through which the material located on the material carrier plate 6" can be acted on if need be.

Figure 7:
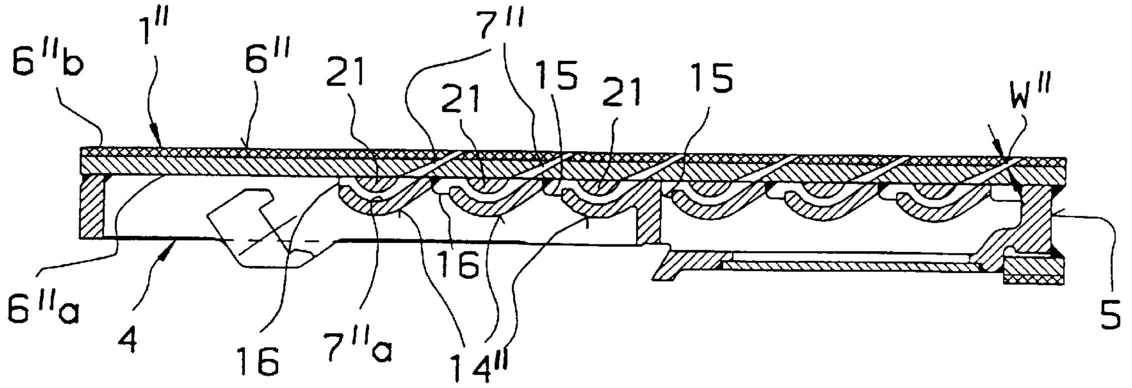
FIGS. 7 and 8 show a vertical longitudinal sectional view as well as a top view of the grate plate of some variants.

FIG. 7 shows yet a further variant which relates to the cross-sectional shape of the supporting ribs 14", which in their arrangement and distribution below the material carrier plate 6" and in the basic plate body 4 or in the outer frame structure 5 thereof correspond precisely to what has been explained above with reference to FIGS. 1 to 6. particularly with reference to FIGS. 5 and 6, so that reference may be made explicitly thereto. Whereas with reference to FIGS. 1, 3, 4 and 5 the reinforcing ribs 14 have the cross-sectional shape of unequal-sided angles, in the variant according to FIG. 7 each supporting rib 14" has an approximately shallow-curved channel cross-section which is concave upwards. In this case a bead-like constriction element 21 is provided in each case which is spaced above each of these channel cross-sections and extends parallel to the appertaining supporting rib 14" and can have approximately the shape of a semi-cylindrical strip (as shown in FIG. 7) and projects downwards from the lower face 6"*a* of the material carrier plate 6" towards the channel cross-section in such a way that together with the appertaining supporting rib 14" it forms a lower duct portion 7"*a* into which the lower end of the appertaining gas flow channel 7" opens. The constriction elements 21 constructed approximately in the manner of semi-cylindrical strips can be fixed as separate parts for example on the lower face 6"*a* of the plate or can also be produced integrally with the basic plate body 4.

Apart from that, in this variant too (FIG. 7) a plurality of upright reinforcing webs 15 which firmly connect adjacent supporting ribs to one another, reach as far as the lower face of the material carrier plate 6"*a* and extend in the longitudinal direction of the plate are again mounted fixed in the channel-shaped supporting ribs 14"—as explained in greater detail with reference to FIGS. 5 and 6—in such a way that again a honeycomb structure is formed with square honeycombs consisting of supporting ribs 14" and reinforcing webs 15 offset with respect to one another.

With regard to the downwardly-arched cross-sectional shape of the supporting ribs 14" according to FIG. 7 it may be added that—as can be seen in the drawing—here too one longitudinal edge of the channel of each supporting rib 14" is directed against the lower face 6"*a* of the material carrier plate 6" and connected thereto, whilst the other longitudinal edge of the channel extends with parallel spacing with respect to the lower face 6"*a* of the plate, thus forming a gas flow gap 16.

Figure 8:
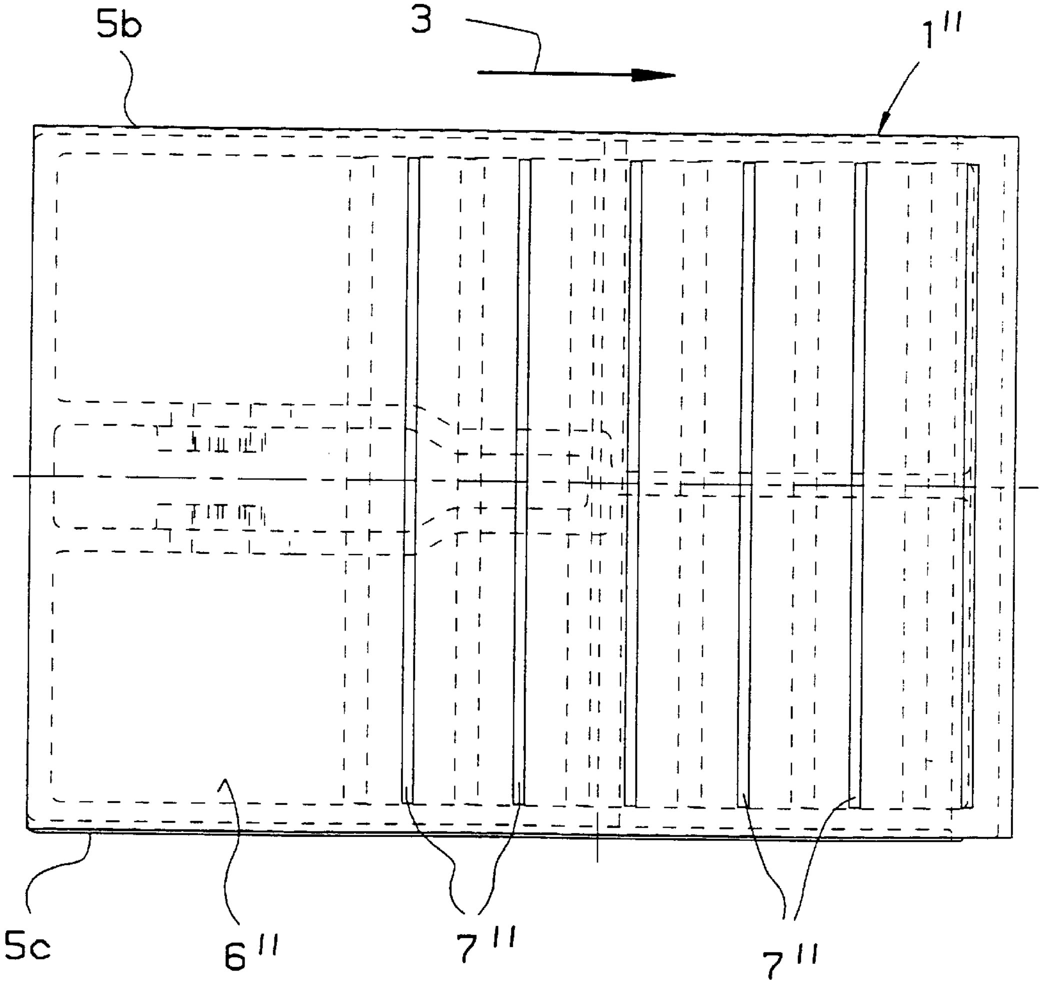

Furthermore, whereas in the first embodiments, as has been explained in particular with reference to FIGS. 1 and 2, a plurality of slot-shaped gas flow channels 7 of substantially the same size in each case in a transverse row are constructed transversely with respect to the material transport direction (arrow 3), according to the variant in FIG. 8 it is proposed that—viewed in the material transport direction (arrow 3)—a plurality of slot-shaped gas flow channels 7" of substantially the same size are provided at least in the front longitudinal portion of the material carrier plate 6" and in this case extend through transversely with respect to the material transport direction (arrow 3) between the two frame side parts 5*b* and 5*c* and in the longitudinal direction of the plate (corresponding to the material transport direction, arrow 3) are disposed equally spaced behind one another and parallel to one another. This means that according to the variant in FIG. 8 there is only one through gas flow channel 7" in each case in the transverse direction of the material carrier plate 6". The supporting structure 13 located below this material carrier plate 6" can either be constructed in precisely the same way as explained with reference to FIGS. 5 and 6 with the supporting ribs 14 and the reinforcing webs 15 or as explained in detail with reference to the variant according to FIG. 7 with the supporting ribs 14" and the reinforcing webs 15. Thus in this variant the supporting ribs 14 or 14" and the reinforcing webs 15 again support the lower face 6"*a* of the material carrier plate 6", so that only the supporting ribs 14 or 14" are then disposed between two transversely extending gas flow channels 7".

What is claimed is:

1. A method of making a grate plate assembly for installation in grate apparatus for heat exchange between a treating gas and a freely-flowable abrasive material movable along a path defined by said grate apparatus, said method comprising forming a material carrier plate from rolled steel sheet material having at one side thereof a supporting surface for said abrasive material;

modifying said carrier plate to harden said supporting surface to an extent sufficient to increase resistance to wear resulting from movement of said abrasive material across said surface;

forming a frame structure;

supporting said carrier plate from below by supports spanning said frame structure;

securing said supports to said carrier plate beneath the latter and to said frame structure in such manner as to provide a passage between each of said supports and said carrier plate; and forming through said carrier plate a plurality of gas flow slots spaced from one another longitudinally of the direction of said path and extending transversely of the direction of said path, each of said gas flow slots being in communication with a respective one of said passages.

2. The method according to claim 1 herein said surface has a hardness of about 58–68 HRC.

3. The method according to claim 1 including forming said surface by adhering to said sheet material an overlying layer of material having a hardness greater than that of said sheet material.

4. The method according to claim 3 wherein the hardness of the material of said layer is about 58–68 HRC.

5. The method according to claim 1 including forming said slots by a laser burning process.

6. The method according to claim 1 including forming said slots by a plasma burning process.

7. The method according to claim 1 including forming said slots by a high pressure water jet and abrasive mixture process.

8. The method according to claim 1 including forming each of said slots so that it extends through said carrier plate in a straight line and obliquely upward in the direction of said path.

9. The method according to claim 8 including forming each of said slots so that it is of substantially uniform width.

10. The method according to claim 8 including forming each of said slots so that it tapers in the direction of said path.

11. The method according to claim 8 including forming a plurality of rows of said slots in said carrier plate, said rows being spaced apart in the direction of said path.

12. The method according to claim 11 wherein the slots of adjacent rows are aligned longitudinally of said path.

13. The method according to claim 11 wherein the slots of adjacent rows are staggered transversely of said path.

14. The method according to claim 1 including forming each of said slots so that it is arcuate in the direction of said path.

15. The method according to claim 1 including forming said frame structure as a metal casting.

16. The method according to claim 15 wherein said reinforcing structure is in the form of a honeycomb.

* * * * *

UNITED STATES PATENT AND TRADEMARK OFFICE

CERTIFICATE OF CORRECTION

PATENT NO. : 6,266,883 B1
DATED : July 31, 2001
INVENTOR(S) : Otto Heinemann et al.

It is certified that error appears in the above-identified patent and that said Letters Patent is hereby corrected as shown below:

Column 2,
Line 62, after "cooling" cancel ",".

Column 7,
Line 27, after "so" insert -- that it --.

Column 8,
Line 40, change "6-1" to -- 6.1 --, change "6-2" to -- 6.2 --;
Line 43, change "6-2" to -- 6.2 --;
Line 67, change "2-5" to -- 2.5 --.

Column 11,
Line 27, change "6"a" to -- 6" --.

Column 12,
Line 29, change "herein" to -- wherein --.

Signed and Sealed this

Twenty-first Day of May, 2002

*Attest:*

JAMES E. ROGAN
*Director of the United States Patent and Trademark Office*

*Attesting Officer*